United States Patent

Lanza et al.

[15] 3,664,865
[45] May 23, 1972

[54] GRAPHITE IMPREGNATED WITH BISMUTH-NICKEL ALLOY

[72] Inventors: Franco Lanza, Varese; Giuseppe Marengo, Angera, both of Italy

[73] Assignee: European Atomic Energy Community (Euratom), Kirchberg, Luxembourg

[22] Filed: Dec. 1, 1969

[21] Appl. No.: 881,337

[30] Foreign Application Priority Data

Dec. 13, 1968 Netherlands..........................6817923

[52] U.S. Cl. .....................117/160 R, 75/134 D, 117/114 R, 176/91 R, 176/91 SP
[51] Int. Cl..........................................................C23c 1/10
[58] Field of Search ...........117/121, 160 R; 176/91 R, 91 SP

[56] References Cited

UNITED STATES PATENTS

| | | | |
|---|---|---|---|
| 1,548,975 | 8/1925 | Bleecker | 117/160 R UX |
| 2,098,062 | 11/1937 | Palmer | 117/160 R X |
| 2,263,164 | 11/1941 | Dailey | 117/160 R X |
| 2,876,139 | 3/1959 | Flowers | 117/160 R X |
| 2,995,471 | 8/1961 | Gurinsky | 117/121 X |
| 3,160,519 | 12/1964 | Parisot et al. | 117/160 R X |
| 3,252,824 | 5/1966 | Whaley et al. | 117/121 X |
| 3,348,967 | 10/1967 | Hucke | 117/121 X |
| 3,436,253 | 4/1969 | Kelsey et al. | 117/160 R |

FOREIGN PATENTS OR APPLICATIONS

| | | | |
|---|---|---|---|
| 255,811 | 2/1963 | Australia | 117/160 R |

*Primary Examiner*—Alfred L. Leavitt
*Assistant Examiner*—J. R. Batten, Jr.
*Attorney*—Stevens, Davis, Miller & Mosher

[57] ABSTRACT

Metal-impregnated graphite is characterized in that the metal consists of an alloy of bismuth and nickel.

5 Claims, No Drawings

GRAPHITE IMPREGNATED WITH BISMUTH-NICKEL ALLOY

The EUR 2988 f Report of June 1966, published by the European Atomic Energy Community, describes processes for impregnating graphite with molten metal to produce an impermeable graphite suitable for use in nuclear reactors as a cladding material for fuel elements or as a structural material for making various parts of such a reactor.

To produce impregnated graphite, the graphite is heated at reduced pressure together with the selected metal to a temperature such that the metal melts. The graphite immersed in the molten metal is then placed under pressure (e.g., the bath is subjected to nitrogen under pressure), removed from the metal bath, and cooled.

Bismuth is one of the substances mentioned as impregnating material. Bismuth-impregnated graphite is, however, unsuitable for the production of certain parts for nuclear reactors, since such parts may be subjected to temperatures above the melting point of bismuth.

In view of the physical properties required of the selected impregnating metal, and more particularly the neutron absorption cross-section, metals such as aluminum and zirconium would be more satisfactory, but it has been found that these metals corrode rapidly when they are exposed to steam or water in contact with graphite at the operating temperature of a nuclear reactor. It has been found that under such conditions graphite reacts as a hydrogen electrode, so that all metals which have a positive electrochemical oxidation potential with respect to a hydrogen electrode corrode under the said conditions.

It has now been found that these disadvantages do not occur or are reduced if the impregnating metal used for the graphite is an alloy of bismuth and nickel.

The invention therefore provides a graphite impregnated with a bismuth-nickel alloy, and parts for nuclear reactors, such as claddings for fuel elements, consisting of said impregnated graphite. It has also been found that bismuth alloys having approximately 9 percent by weight of nickel and approximately 25 percent by weight of nickel meet the requirements most satisfactorily.

However, bismuth alloys having nickel contents of 8 to 27 percent by weight have favorable properties. The alloy containing 9 percent by weight of nickel, hereinafter referred to as Bi-Ni (9) is preferably impregnated in the graphite at a temperature of 800° C and under a nitrogen pressure of 20 kg/cm$^2$ and the resulting graphite can withstand an operating temperature of 460° C. The alloy containing 25 percent by weight of nickel, hereinafter referred to as Bi-Ni (25) can be impregnated in the graphite at 1,250° C and under a pressure of 20 kg/cm$^2$ and the resulting graphite withstands an operating temperature of 650° C.

Depending upon the graphite used as starting material, the impregnated graphite contains approximately 10 to 20 percent by volume of the alloy.

The corrosion of the graphite impregnated according to the invention and expressed as the reduction of the weight of samples in mg/cm$^2$ after such samples have been in contact with steam for some time at a high temperature, is comparable to the corrosion of unimpregnated graphite, as will be apparent from the following table:

| Material | Temp. in °C. | Time in hours | Reduction of weight |
|---|---|---|---|
| Graphite containing 15% by volume of Bi-Ni(9) | 400 | 550 | 0.4 |
| Graphite containing 15% by volume of Bi-Ni(25) | 600 | 500 | 0.23 |
| Unimpregnated graphite | 600 | 500 | 0.31 |

The material according to the invention is therefore suitable for use in nuclear reactors in which it comes into contact with water or steam at high temperature.

We claim:
1. Metal-impregnated graphite, characterized in that the metal consists of an alloy of bismuth and nickel.
2. Metal-impregnated graphite as claimed in claim 1 characterized in that the alloy contains 8 to 27 percent by weight of nickel.
3. Metal-impregnated graphite as claimed in claim 2 characterized in that the alloy contains approximately 9 percent by weight of nickel.
4. Metal-impregnated graphite as claimed in claim 2 characterized in that the alloy contains approximately 25 percent by weight of nickel.
5. A nuclear reactor part constructed of metal-impregnated graphite according to claim 1.

* * * * *